United States Patent Office 2,924,523
Patented Feb. 9, 1960

2,924,523
SWINE FEED SUPPLEMENT

Marvin C. Bachman, Jerome L. Martin, and Joseph M. Pensack, Terre Haute, Ind., assignors to Commercial Solvents Corporation, Terre Haute, Ind., a corporation of Maryland No Drawing. Application January 29, 1958
Serial No. 711,772

13 Claims. (Cl. 99—2)

Our invention relates to a swine feed additive, and more particularly, it relates to swine feeds containing a compound having the following structural formula:

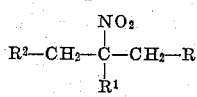

where R is a radical selected from the group consisting of hydrogen, methyl, hydroxy and carbamyl, $R^1$ is a radical selected from the group consisting of lower alkyl and lower hydroxyalkyl; and $R^2$ is selected from the group consisting of hydroxy and carbamyl.

Epicures have long praised the low fat content of bacon from Denmark, while ignoring the fatty bacon generally produced on the North American continent. Danish farmers feed their pigs large amounts of milk. This high protein feed produces lean, muscular pigs having little back fat. American farmers prefer to feed their swine diets containing large amounts of cheap energy sources such as corn, milo, barley, etc. in spite of the fact that the resulting pig does not bring the highest market prices due to the fact that hams and bacon containing excessive amounts of fat do not sell well.

We have now discovered that swine fed the above-described nitroalcohols and nitrocarbamates are lean and show a decided decrease in the amount of back fat formed during growth, while maintaining essentially the same degree of feed utilization and rate of growth.

Compounds coming within the above-described structural formula include: 2-nitro-2-propyl-1,3-propanediol, 2-nitro-2-methyl-1,3-propanediol dicarbamate, 2-nitro-2-methyl-1,3-propanediol, 2-nitro-2-ethyl-1,3-propanediol dicarbamate, 2-nitro-2-methyl-1-propanol, 2-nitro-2-methyl-1-butanol carbamate, etc.

Our additives may be fed to swine as part of complete feeds or as part of a supplement for the carbohydrate source. Generally, the supplements contain from about 36 to about 40% protein, and vitamins, minerals, and other nutritive additives which form a balanced diet when fed to swine with a particular carbohydrate source. Generally, swine growers prefer to feed the carbohydrate and the protein feed supplement separately, as the swine, through free choice, generally eat sufficient amounts of the protein supplement to obtain a balanced diet. From about 25 to about 2500 grams of our active ingredients are needed per ton of supplement where the carbohydrate source and supplement are fed separately. About 5 to about 500 grams of our active ingredients are needed per ton of complete swine feed. If these amounts of our active ingredients are added to the complete feed and supplement the swine exhibit the desired type of growth and there is no marked decrease in feed utilization efficiency or rate of growth.

It is to be understood that not all of our compounds are active to the same degree and that the active ingredients of our invention may be utilized individually or as mixtures.

The following example is given to illustrate our invention, but it is not intended that our invention be limited to the procedures, amounts of active ingredients, or described rations, but rather it is intended that all equivalents obvious to those skilled in the art be included within the scope of our invention.

EXAMPLE I

The efficacy of our invention was demonstrated by feeding pigs complete feeds containing 100 g./ton of 2-nitro-2-methyl-1-propanol and 2-nitro-2-propyl-1,3-propanediol respectively and comparing the depth of back fat on these pigs with the back fat of pigs fed the same complete feed containing no additives, duplicate groups of pigs being fed in each case. Different feed formulas were fed to the pigs at various times during their growth. Thus, a high protein content feed was fed to the younger pigs, while a high carbohydrate content feed was fed to the pigs during the final stages of growth when the pigs are normally fattened for market. When the pigs weighed 45-75 pounds the following complete feed was fed:

Swine Formula A

| | | |
|---|---|---|
| Ground yellow corn | lb | 1510 |
| Meat and bone scraps, 50% | lb | 50 |
| Soybean oil meal, 44% | lb | 350 |
| Dehydrated alfalfa meal, 17% | lb | 50 |
| Ground limestone | lb | 10 |
| Dicalcium phosphate | lb | 20 |
| Trace mineral salt | lb | 12 |
| Riboflavin feed supplement (3.6 g./lb. riboflavin) | lb | 0.5 |
| Choline feed supplement (25% choline chloride) | lb | 2 |
| Propionic acid fermentation residues (6 mg./lb. vitamin $B_{12}$) | lb | 2.5 |
| Vitamin $D_2$ (4 million I.U./lb.) | grams | 91 |
| Calcium pantothenate | do | 6 |
| Niacin | do | 15 |
| Baciferm-PB-10 (zinc bacitracin, 7.5 g./lb. and procaine penicillin 2.5 g./lb.) | lb | 2.5 |
| Aureomycin supplement (10 g./lb.) | lb | 1.25 |
| Terramycin supplement (10 g./lb.) | lb | 1.25 |
| Calculated analysis: | | |
| Protein | percent | 16.1 |
| Fat | do | 3.2 |
| Fiber | do | 3.7 |
| Calcium | do | 0.78 |
| Phosphorus | do | 0.60 |
| Vitamin A | I.U./lb | 3620 |
| Vitamin $D_2$ | I.U./lb | 400 |
| Riboflavin | mg./lb | 1.74 |
| Pantothenic acid | mg./lb | 6.15 |
| Niacin | mg./lb | 16.17 |
| Choline | mg./lb | 500 |
| Vitamin $B_{12}$ | μg./lb | 7.5 |
| Lysine | percent | 0.71 |
| Tryptophan | do | 0.16 |
| Methionine | do | 0.31 |
| Cystine | do | 0.24 |

At 75–125 pounds the following complete feed was utilized:

Swine Formula B

| | | |
|---|---|---|
| Ground yellow corn | lb | 1640 |
| Meat and bone scraps, 50% | lb | 50 |
| Soybean oil meal, 44% | lb | 230 |
| Dehydrated alfalfa meal, 17% | lb | 50 |
| Ground limestone | lb | 12 |
| Dicalcium phosphate | lb | 10 |
| Trace mineral salt | lb | 12 |
| Riboflavin feed supplement (3.6 g./lb. riboflavin) | lb | 0.4 |

| | |
|---|---|
| Choline feed supplement (25% choline chloride) lb | 1.0 |
| Propionic acid fermentation residues (6 mg./lb. vitamin $B_{12}$) lb | 1.7 |
| Vitamin $D_2$ (4 million I.U./lb.) grams | 69 |
| Calcium pantothenate do | 5 |
| Niacin do | 12 |
| Baciferm–PB–10 (zinc bacitracin, 7.5 g./lb. and procaine penicillin 2.5 g./lb.) do | 227 |
| Aureomycin supplement (10 g./lb.) do | 113 |
| Terramycin supplement (10 g./lb.) do | 113 |

Calculated analysis:

| | |
|---|---|
| Protein percent | 14.0 |
| Fat do | 3.4 |
| Fiber do | 3.5 |
| Calcium do | 0.67 |
| Phosphorus do | 0.49 |
| Vitamin A I.U./lb | 3718 |
| Vitamin $D_2$ I.U./lb | 300 |
| Riboflavin mg./lb | 1.51 |
| Pantothenic acid mg./lb | 5.48 |
| Niacin mg./lb | 15.2 |
| Choline mg./lb | 386 |
| Vitamin $B_{12}$ μg./lb | 5 |
| Lysine percent | 0.54 |
| Trypotophan do | 0.13 |
| Methionine do | 0.29 |
| Cystine do | 0.21 |

At 125–200 pounds the following complete feed was utilized:

*Swine Formula C*

| | |
|---|---|
| Ground yellow corn lb | 1750 |
| Meat and bone scraps, 50% lb | 50 |
| Soybean oil mean, 44% lb | 120 |
| Dehydrated alfalfa meal, 17% lb | 50 |
| Ground limestone lb | 15 |
| Dicalcium phosphate lb | 7 |
| Trace mineral salt lb | 12 |
| Riboflavin feed supplement (3.6 g./lb. riboflavin) lb | 0.4 |
| Choline feed supplement (25% choline chloride) lb | 1 |
| Propionic acid fermentation residues (6 mg./lb. vitamin $B_{12}$) lb | 1.7 |
| Vitamin $D_2$ (4 million I.U./lb.) grams | 69 |
| Calcium pantothenate do | 5 |
| Niacin do | 12 |
| Baciferm–PB–10 (zinc bacitracin, 7.5 g./lb. and procaine penicillin 2.5 g./lb.) do | 227 |
| Aureomycin supplement (10 g./lb.) do | 113 |
| Terramycin supplement (10 g./lb.) do | 113 |

Calculated analysis:

| | |
|---|---|
| Protein percent | 12.03 |
| Fat do | 3.62 |
| Fiber do | 3.26 |
| Calcium do | 0.68 |
| Phosphorus do | 0.45 |
| Vitamin A I.U./lb | 3800 |
| Vitamin $D_2$ I.U./lb | 303 |
| Riboflavin mg./lb | 1.47 |
| Pantothenic acid mg./lb | 5.31 |
| Niacin mg./lb | 15.24 |
| Choline mg./lb | 330 |
| Vitamin $B_{12}$ μg./lb | 5 |
| Lysine percent | 0.42 |
| Tryptophan do | 0.11 |
| Methionine do | 0.25 |
| Cystine do | 0.18 |

The amount of back fat formed on the pigs was determined by taking measurements of the fat depth at three points on the backs of the pigs when they weighed about 150 and 200 pounds. The fat depth was measured by means of a Duncan Electric Manufacturing Company Lean Meter. This instrument uses the electrical conductivity differential between fat and muscle to indicate whether the measuring needle is embedded in adipose tissue or in muscle. The measured depth of needle penetration, less skin thickness, determines the thickness of fatty deposits.

The following table sets out the relative amounts of back fat when pigs fed the above feeds weighed approximately 150 and 200 pounds.

DEPTH OF BACK FAT AT 150 LBS.

| Complete Feed | No. Pigs | Av. Wt. (Lbs.) | Back-Fat (Inches) | Percent Response |
|---|---|---|---|---|
| Control | 19 | 149.5 | 1.534–1.262–1.105=1.300 | |
| Control+ Additive 1 [1] | 20 | 152.5 | 1.444–1.239–1.115=1.266 | Leaner 2.6%. |
| Control+ Additive 2 [2] | 18 | 151.3 | 1.317–1.178–1.033=1.176 | Leaner 9.5%. |

DEPTH OF BACK FAT AT 200 LBS.

| Complete Feed | No. Pigs | Av. Wt. (Lbs.) | Back-Fat (Inches) | Percent Response |
|---|---|---|---|---|
| Control | 19 | 202.4 | 1.884–1.660–1.385=1.643 | |
| Control+ Additive 1 [1] | 20 | 201.0 | 1.763–1.523–1.293=1.526 | Leaner 7.1%. |
| Control+ Additive 2 [2] | 18 | 200.9 | 1.775–1.580–1.283=1.546 | Leaner 5.9%. |

[1] 2-nitro-2-methyl-1-propanol.
[2] 2-nitro-2-propyl-1,3-propanediol.

The feed efficiency and average daily weight gain of the pigs are set out in the following table.

| Complete Feed | Feed Efficiency and Daily Gain at 200 Lbs. | |
|---|---|---|
| | Average Daily Gain (Pounds) | Lbs. Feed per lb. Gain |
| Control | 1.784 | 373.5 |
| Control+Additive 1 [1] | 1.758 | 378.0 |
| Control+Additive 2 [2] | 1.759 | 368.1 |

[1] 2-nitro-2-methyl-1-propanol.
[2] 2-nitro-2-propyl-1,3-propanediol.

Now having described our invention, what we claim is:

1. A swine feed containing as an essential active ingredient a small but effective amount to reduce the formation of adipose tissue of a compound having the following structural formula:

where R is a radical selected from the group consisting of hydrogen, methyl, hydroxy, and carbamyl, $R^1$ is a radical selected from the group consisting of lower alkyl and lower hydroxyalkyl, and $R^2$ is selected from the group consisting of hydroxy and carbamyl.

2. A nutrient feed for swine containing as an essential active ingredient a small but effective amount to reduce the formation of adipose tissue of a compound selected from the group consisting of compounds having the following structural formula:

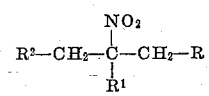

where R is a radical selected from the group consisting of hydrogen, methyl, hydroxy, and carbamyl, $R^1$ is a radical selected from the group consisting of lower alkyl and lower hydroxyalkyl; and $R^2$ is selected from the group consisting of hydroxy and carbamyl; and mixtures thereof.

3. A swine feed comprising from about 0.0005 to 0.06% of a compound having the following structural formula:

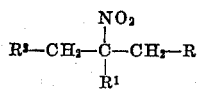

where R is a radical selected from the group consisting of hydrogen, methyl, hydroxy, and carbamyl, R¹ is a radical selected from the group consisting of lower alkyl and lower hydroxyalkyl; and R² is selected from the group consisting of hydroxy and carbamyl in a nutrient diluent.

4. A swine feed supplement comprising from about 0.0025 to about 0.30% of a compound having the following structural formula:

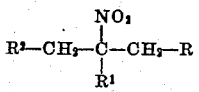

where R is a radical selected from the group consisting of hydrogen, methyl, hydroxy, and carbamyl, R¹ is a radical selected from the group consisting of lower alkyl and lower hydroxyalkyl; and R² is selected from the group consisting of hydroxy and carbamyl in a nutrient diluent.

5. A process for the production of swine which comprises feeding said swine a nutrient ration containing a small but effective amount to reduce the formation of adipose tissue of a compound having the following structural formula:

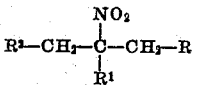

where R is a radical selected from the group consisting of hydrogen, methyl, hydroxy, and carbamyl, R¹ is a radical selected from the group consisting of lower alkyl and lower hydroxyalkyl; and R² is selected from the group consisting of hydroxy and carbamyl.

6. A process for the production of swine which comprises feeding said swine a nutrient ration containing from about 0.0005 to 0.06% of a compound having the following structural formula:

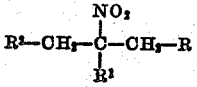

where R is a radical selected from the group consisting of hydrogen, methyl, hydroxy, and carbamyl, R¹ is a radical selected from the group consisting of lower hydroxyalkyl; and R² is selected from the group consisting of hydroxy and carbamyl.

7. A process for the production of swine which comprises feeding said swine corn and a nutrient ration containing from about 0.0025 to about 0.30% of a compound having the following structural formula:

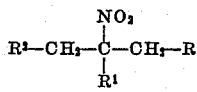

where R is a radical selected from the group consisting of hydrogen, methyl, hydroxy, and carbamyl, R¹ is a radical selected from the group consisting of lower hydroxyalkyl; and R² is selected from the group consisting of hydroxy and carbamyl.

8. A swine feed comprising from about 0.0005 to about 0.30% of 2-nitro-2-methyl-1-propanol in a nutrient diluent.

9. A swine feed comprising from about 0.0005 to about 0.30% of 2-nitro-2-ethyl-1-propanol in a nutrient diluent.

10. A swine feed comprising from about 0.0005 to about 0.30% of 2-nitro-2-methyl-1-propanol carbamate in a nutrient diluent.

11. A swine feed comprising from about 0.0005 to about 0.30% of 2-nitro-2-propyl-1,3-propanediol in a nutrient diluent.

12. A swine feed comprising from about 0.0005 to about 0.30% of 2-nitro-2-propyl-1,3-propanediol dicarbamate in a nutrient diluent.

13. A swine feed comprising from about 0.0005 to about 0.30% of tris(hydroxymethyl)nitromethane in a nutrient diluent.

References Cited in the file of this patent

Wilkins: Annals of N.Y. Academy of Sciences 59 (1954), pp. 36–44.

Slater et al.: Jr. Am. Phar. Assoc. Scient. Ed. 43 (1954), pp. 547–50.

Agri. News Letter, Du Pont de Nemours & Co., Summer 1957, vol. 25, pp. 3 and 4.